(12) United States Patent
Liu

(10) Patent No.: US 12,491,040 B2
(45) Date of Patent: Dec. 9, 2025

(54) INPUT DEVICE AND SURGICAL ROBOT

(71) Applicant: Shenzhen Edge Medical CO., Ltd., Guangdong (CN)

(72) Inventor: Fang Liu, Shenzhen (CN)

(73) Assignee: Shenzhen Edge Medical CO., Ltd., Guangdong (CN)

( * ) Notice: Subject to any disclaimer, the term of this patent is extended or adjusted under 35 U.S.C. 154(b) by 314 days.

(21) Appl. No.: 18/494,098

(22) Filed: Oct. 25, 2023

(65) Prior Publication Data

US 2024/0050180 A1   Feb. 15, 2024

Related U.S. Application Data

(63) Continuation-in-part of application No. PCT/CN2022/087023, filed on Apr. 15, 2022.

(30) Foreign Application Priority Data

Apr. 27, 2021   (CN) .......................... 202110462541.6

(51) Int. Cl.
*A61B 34/37* (2016.01)
*A61B 34/00* (2016.01)

(52) U.S. Cl.
CPC .............. *A61B 34/74* (2016.02); *A61B 34/25* (2016.02); *A61B 34/37* (2016.02)

(58) Field of Classification Search
CPC ......... A61B 34/25; A61B 34/37; A61B 34/74; A61B 2034/742; A61B 2017/00477; A61B 90/361; A61B 2017/0046
See application file for complete search history.

(56) References Cited

U.S. PATENT DOCUMENTS

| | | | | |
|---|---|---|---|---|
| 7,914,521 B2* | 3/2011 | Wang | ...................... | A61B 34/70 606/1 |
| 9,717,563 B2* | 8/2017 | Tognaccini | ............ | A61B 1/018 |
| 12,376,927 B2* | 8/2025 | Chassot | ................ | A61B 34/37 |
| 2015/0018841 A1* | 1/2015 | Seo | ........................ | A61B 34/77 606/130 |

(Continued)

FOREIGN PATENT DOCUMENTS

WO   2020/041513 A1   2/2020

OTHER PUBLICATIONS

Brown et al., A precision manipulator module for assembly in a minifactory environment, 2001, IEEE, p. 1030-1035 (Year: 2001).*

(Continued)

*Primary Examiner* — Mcdieunel Marc
(74) *Attorney, Agent, or Firm* — ScienBiziP, P.C.

(57) ABSTRACT

An input device and a surgical robot. The input device includes a support part, a handle, and a cordless electrical connector. The handle is rotational connected to the support part. The cordless electrical connector includes a first connection portion and a second connection portion. The first connection portion is fixedly installed on the support part. The second connection portion is fixedly installed on the handle. A surface of the first connection portion abuts against a surface of the second connection portion so that the two connection portions are electrically connected, such that when the handle rotates continuously, electronic devices in the handle and electronic devices in the support part are always kept electrically connected by the cordless electrical connector.

18 Claims, 9 Drawing Sheets

(56) References Cited

U.S. PATENT DOCUMENTS

| | | | |
|---|---|---|---|
| 2018/0311002 A1* | 11/2018 | Giordano | A61B 17/07207 |
| 2020/0246092 A1* | 8/2020 | Robinson | A61B 34/30 |
| 2020/0289142 A1* | 9/2020 | Brisson | A61B 17/285 |
| 2020/0397524 A1* | 12/2020 | Kapadia | A61B 34/74 |
| 2021/0346109 A1* | 11/2021 | Hares | A61B 5/24 |

OTHER PUBLICATIONS

Donno et al., Introducing STRAS: A new flexible robotic system for minimally invasive surgery, 2013, IEEE, p. 1213-1220 (Year: 2013).*

Zorn et al., A Novel Telemanipulated Robotic Assistant for Surgical Endoscopy: Preclinical Application to ESD, 2017, IEEE, p. 797-808 (Year: 2013).*

Schwarm et al., A Floating-Piston Hydrostatic Linear Actuator and Remote-Direct-Drive 2-DOF Gripper, 2019, IEEE, p. 7562-7568 (Year: 2019).*

* cited by examiner

INPUT DEVICE AND SURGICAL ROBOT

CROSS-REFERENCE TO RELATED APPLICATIONS

The present application is a continuation-in-part of International Application No. PCT/CN2022/087023 filed on Apr. 15, 2022, which claims the priority of the Chinese patent application No. 202110462541.6, filed on Apr. 27, 2021, and entitled "input device, main operating device, and surgical robot", which are incorporated herein by reference in their entireties.

TECHNICAL FIELD

The present application relates to the field of medical instruments, and particularly to an input device and a surgical robot having the input device.

BACKGROUND

Minimally invasive surgery refers to a surgical method that uses modern medical instruments such as laparoscope and thoracoscope and related equipment to perform surgery inside the human cavity. Compared with traditional surgical methods, minimally invasive surgery has the advantages of less trauma, less pain, and faster recovery.

With the advancement of science and technology, the technology of minimally invasive surgical robots has gradually matured and been widely used. The minimally invasive surgical robot usually includes a master console and a slave operating device. The master console is used to send control commands to the slave operating device according to the operation of the doctor to control the slave operating device, and the slave operating device is used to respond to the control command sent by the master console, and perform corresponding surgical operations. The surgical instrument is connected with the driving device of the slave operating device for performing a surgical operation, and the end instrument of the surgical instrument includes an end effector for performing the surgical operation and a joint connected with the end effector that can move with multiple degrees of freedom (DOF).

The main operating device is connected with an input device, and the input device and the end effector establish a mapping relationship. The operator controls the action of the end effector by operating the input device. In the control of many actions of the end effector by the input device, the rolling action of the end effector is controlled by the rotation of the handle of the input device. There are many signal transmission cables in the handle of the current input device, which makes it impossible to realize infinite rotation of the handle, and makes the rolling control of the end effector not convenient.

SUMMARY

Based on this, in order to solve the above problems, a first aspect of the present application provides an input device, including:
  a support;
  a handle, wherein the handle is configured to be rotationally connected to the support;
  a cordless electrical connector, wherein the cordless electrical connector includes a first connection portion and a second connection portion, the first connection portion is mounted on the support, the second connection portion is mounted on the handle, and a surface of the first connection portion abuts against a surface of the second connection portion, so that the first connection portion is electrically coupled to the second connection portion.

In an embodiment, wherein the first connection portion includes one of a first conductive ring and a conductive terminal, the second connection portion includes another one of the conductive ring and the conductive terminal, and a surface of the first conductive ring abuts against a surface of the conductive terminal.

In an embodiment, wherein the first connection portion includes a first conductive ring, the second connection portion includes a second conductive ring, and a surface of the first conductive ring abuts against a surface of the second conductive ring.

In an embodiment, wherein there are a plurality of first conductive rings, including the first conductive ring, and the plurality of first conductive rings is arranged concentrically.

In an embodiment, wherein the plurality of first conductive rings is located on a first plane, and the first plane is perpendicular to a rotational axis of the handle.

In an embodiment, wherein the input device further includes a first circuit board, the first circuit board is mounted on the handle, and the conductive terminal is mounted on the first circuit board and electrically coupled to the first circuit board.

In an embodiment, wherein a plurality of conductive terminals, including the conductive terminal, is staggered mounted on the first circuit board.

In an embodiment, wherein the conductive terminal includes a base and an elastic connecting plate, the base is fixed on the first circuit board, one end of the connecting plate is mounted on the base, and a surface of another end abuts against the first conductive ring.

In an embodiment, wherein a distal end of the handle extends beyond a first edge, and a distal surface of the first edge is located between the first circuit board and the first connecting portion.

In an embodiment, wherein a proximal end of the support extends out a second edge, and a proximal surface of the second edge is located between the distal surface of the first edge and the first circuit board, and/or the distal surface of the first edge is located between the first connection portion and the proximal surface of the second edge.

In an embodiment, wherein the input device further includes a second circuit board, the second circuit board is mounted inside the support, and a plurality of the first conductive rings, including the first conductive ring, is electrically connected to the second circuit board.

In an embodiment, wherein the first connection portion includes a first surface close to the second connection portion and a second surface away from the second connection portion, the second connection portion abuts against the first surface, and the second circuit board is connected with the second surface.

In an embodiment, wherein the input device further includes a first electronic device located inside the handle and a second electronic device located inside the support, and the first electronic device is electrically connected to the second electronic device through the cordless electrical connector.

In an embodiment, wherein the first electronic device is connected to a first circuit board inside the handle, and/or the second electronic device is connected to a second circuit board inside the support.

In an embodiment, wherein the input device further includes a clamp mounted on the handle, and the first electronic device includes a first sensor for detecting opening and closing degrees of freedom motion of the clamp.

In an embodiment, wherein the input device further includes a first magnet, the first magnet is connected with the clamp, and a motion of the clamp relative to the handle makes the first magnet move relative to the first sensor, so that the first sensor detects changes in magnetic field strength to detect the opening and closing degrees of freedom motion of the clamp.

In an embodiment, wherein the first magnet is connected to the clamp through a linkage assembly, the linkage assembly includes a first link and a second link, and one end of the first link is pivotally connected to the clamp, and another end is pivotally connected to a proximal end of the second link, the second link is located between the first link and the support, and the first magnet is fixed at a distal end of the second link.

In an embodiment, wherein there are the two first magnets, including the first magnet, the two first magnets are mounted on the clamp, and the first sensor is located between the two first magnets.

In an embodiment, wherein the second electronic device includes a signal processor for processing signals from the first electronic device and/or sending signals to the first electronic device.

In an embodiment, wherein the second electronic device includes a second sensor for detecting the rotational degree of freedom motion of the clamp.

In an embodiment, wherein the input device further includes a rotating shaft which is rotationally connected with the support, a second magnet is disposed on the rotating shaft, and a rotation of the rotating shaft relative to the support rotates the second magnet relative to the second sensor, so that the second sensor detects changes in magnetic field strength to detect the rotational degree of freedom motion of the clamp.

In an embodiment, wherein the input device further includes a motor located inside the support, a rotary shaft of the motor is connected with the rotating shaft through a gear, or the rotating shaft is fixedly with a rotor of the motor.

In an embodiment, wherein the input device further includes a third sensor and a controller, the third sensor is configured to detect a rotational motion of the motor, and the controller is configured to control the motor according to information detected by the second sensor and the third sensor.

In an embodiment, wherein the second electronic device further includes a power source for providing electrical energy to the first electronic device through the cordless electrical connector.

In an embodiment, wherein the first electronic device includes a switch assembly, and the switch assembly is used to generate a signal for controlling an on-off of the power source, and/or to generate a trigger signal to be sent to a device connected to the input device.

In an embodiment, wherein the clamp includes a first clamping arm and a second clamping arm, and the two first sensors, including the first sensor, are respectively mounted on the first clamping arm and the second clamping arm.

In an embodiment, wherein a proximal end of the first clamping arm has an arc-shaped groove, and a proximal end of the second clamping arm has a convex column accommodated in the arc-shaped groove, and the arc-shaped groove is used for moving against the convex column when the first clamping arm moves toward the handle, so as to drive the second clamping arm to move toward the handle at a same angular velocity as the first clamping arm.

In an embodiment, wherein the input device further includes a flexible circuit board, and the first sensor and/or the switch assembly are electrically connected to the cordless electrical connector through the flexible circuit board.

In an embodiment, wherein the flexible circuit board includes a first flexible circuit board body, a second flexible circuit board body, and a third flexible circuit board body, free ends of the first flexible circuit board body and the second flexible circuit board body extend toward a proximal end of the handle, and the third flexible circuit board body extends along a distal end of the handle to be electrically connected to the cordless electrical connector.

In an embodiment, wherein the first sensor is mounted on the middle area of the flexible circuit board, and the two switch assemblies, including the switch assembly, are respectively provided on the first flexible circuit board body and the second flexible circuit board body.

A second aspect of the embodiments of the present application further provides an input device, including:
 a support;
 a handle, wherein the handle is configured to be rotationally connected to the support;
 a clamp, wherein the clamp is mounted on the handle; and
 a first sensor, wherein the first sensor is mounted inside the handle, and the first sensor is configured to detect opening and closing degrees of freedom motion of the clamp.

In an embodiment, wherein the input device further includes a first magnet, the first magnet is connected with the clamp; and the clamp motion causes the first magnet to move relative to the first sensor, so that the first sensor detects changes in magnetic field strength to detect the opening and closing degrees of freedom motion of the clamp.

In an embodiment, wherein there are the two first magnets, including the first magnet, the two first magnets are mounted on the clamp, and the first sensor is located between the two first magnets.

In an embodiment, wherein the input device further includes a linkage assembly, and the first magnet is connected to the clamp through the linkage assembly.

In an embodiment, wherein the linkage assembly includes a first link and a second link, and one end of the first link is pivotally connected to the clamp, and another end is pivotally connected to a proximal end of the second link, the second link is located between the first link and the support, and the first magnet is fixed at a distal end of the second link.

In an embodiment, wherein the clamp includes a first clamping arm and a second clamping arm; and the two first magnets are mounted on the first clamping arm and the second clamping arm, respectively; a proximal end of the first clamping arm has an arc-shaped groove, a proximal end of the second clamping arm has a convex column accommodated in the arc-shaped groove, and the arc-shaped groove is used for moving against the convex column when the first clamping arm moves toward the handle, so as to drive the second clamping arm to move toward the handle at a same angular velocity as the first clamping arm.

In an embodiment, wherein the input device further includes a second sensor provided inside the support, and the second sensor is used to detect a rotational degree of freedom motion of the clamp.

In an embodiment, wherein the input device further includes a rotating shaft, one end of the rotating shaft is fixedly connected with the handle, another end is rotationally connected with the support, a second magnet is provided on a distal end of the rotating shaft, and the rotating shaft is used to rotate relative to the support to rotate the second magnet relative to the second sensor, so that the second sensor detects changes in magnetic field strength to detect the rotational degree of freedom motion of the clamp.

In an embodiment, wherein the input device further includes a motor located inside the support, a rotary shaft of the motor is connected with the rotating shaft through a gear, or the rotating shaft is fixedly with a rotor of the motor.

In an embodiment, wherein the input device further includes a second sensor provided inside the support, and the second sensor is arranged on the motor and is used to detect a rotational motion of the motor.

In an embodiment, wherein the input device further includes a third sensor and a controller, the third sensor is used to detect the rotational motion of the motor, and the controller is used to control the motor according to information detected by the second sensor and the third sensor.

In an embodiment, wherein the third sensor and the controller are located inside the support.

A third aspect of the embodiments of the present application further provides a main operating device, including: a master console and the above-mentioned input device, and the master console is used to process signals input by the input device.

A fourth aspect of the embodiments of the present application further provides a surgical robot, including: a slave operating device and the above-mentioned main operating device, and the slave operating device performs a corresponding operation according to an instruction of the main operating device.

The handle of the input device of the present application is rotationally mounted on the support, the electronic device in the handle is electrically connected to the electronic device in the support through the cordless electrical connector, and there is no transmission cable between the handle and the support, so that how the handle rotates relative to the support, the electronic device in the handle and the electronic device in the support can always maintain the electrical connection, thus allowing the handle to rotate infinitely relative to the support, which is more convenient for the operator to operate the input device. In addition, the electrical signal between the electronic device in the handle and the electronic device in the support is transmitted directly through the cordless electrical connector, and there is no signal conversion during the transmission for reducing the loss of the signal.

DETAILED DESCRIPTION

Figure 1:
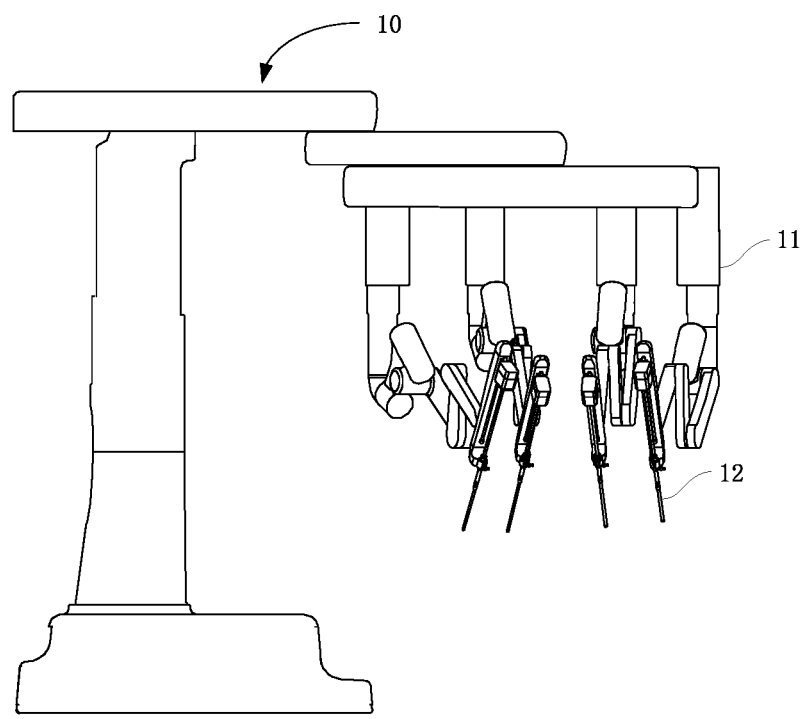
FIG. 1 is a schematic diagram of a slave operating device of a surgical robot according to an embodiment of the present application.

For ease of understanding of the present disclosure, the present disclosure will be described more fully hereinafter with reference to the associated drawings. Some embodiments of the present disclosure are set forth in the accompanying drawings. This application may, however, be embodied in many different forms and is not limited to the embodiments described herein. Rather, these embodiments are provided for the purpose of providing a more thorough and complete understanding of the disclosure of the present disclosure.

It should be noted that when an element is referred to as being "disposed on" another element, it may be directly on another element or intervening elements may also be present.

It should be noted that when an element is referred to as being "disposed on" another element, it can be directly on the other element or intervening elements may also be present. When an element is referred to as being "connected" to another element, it can be directly connected to the other element or intervening elements may also be present. When an element is considered to be "coupled" to another element, it can be directly coupled to the other element or intervening elements may also be present. The terms "vertical," "horizontal," "left," "right," "above," "below," and similar expressions used herein are for illustrative purposes only and are not meant to be the only way of implementation, It is to be understood that these space-related terms are intended to encompass the different orientations of the device in use or in operation in addition to those depicted in the figures, for example, if the device in the figures is flipped, the elements or features described as being "below" or "under" the other elements or features will be described as being "above" the other elements or features. Thus, the example term "below" can encompass both an orientation of above and below.

As used herein, the terms "distal end" and "proximal end" are common terms in the art of interventional medical devices, where "distal end" refers to the end far away from the operator during the surgical procedure, and the "proximal end" refers to the end close to the operator during the surgical procedure. "Coupling" as used herein can be broadly understood as where two or more objects are connected in one way to any event, which allows absolutely coupled objects to operate together so that they do not move relative to each other in at least one direction, such as the coupling of a protrusion and a groove, which can move relative to each other in the radial direction but not in the axial direction.

The term "instrument" is used herein to describe a medical device for insertion into a patient's body and for performing a surgical or diagnostic procedure, the instrument including an end effector, which may be a surgical tool associated with performing a surgical procedure, such as electrocautery, clamps, staplers, cutters, imaging devices (e.g., endoscope or ultrasound probe), and similar. Some instruments used in embodiments of the present application further include articulation components (e.g., joint assemblies) provided for the end effector, such that the position and orientation of the end effector can be manipulated for movement with one or more mechanical DOF relative to the axis of the instrument. Further, the end effector further includes functional mechanical DOF, such as opening and closing clamps. The instrument may also include stored information that can be updated by the surgical system, whereby the storage system may provide one-way or two-way communication between the instrument and one or more system elements.

Unless otherwise defined, all technical and scientific terms used herein have the same meaning as commonly understood by one skilled in the art. The terminology used herein is for the purpose of describing particular embodiments only and is not intended to be limiting of the present application. As used herein, the term "and/or" includes all combinations of one or more of the associated listed items.

Figure 2:
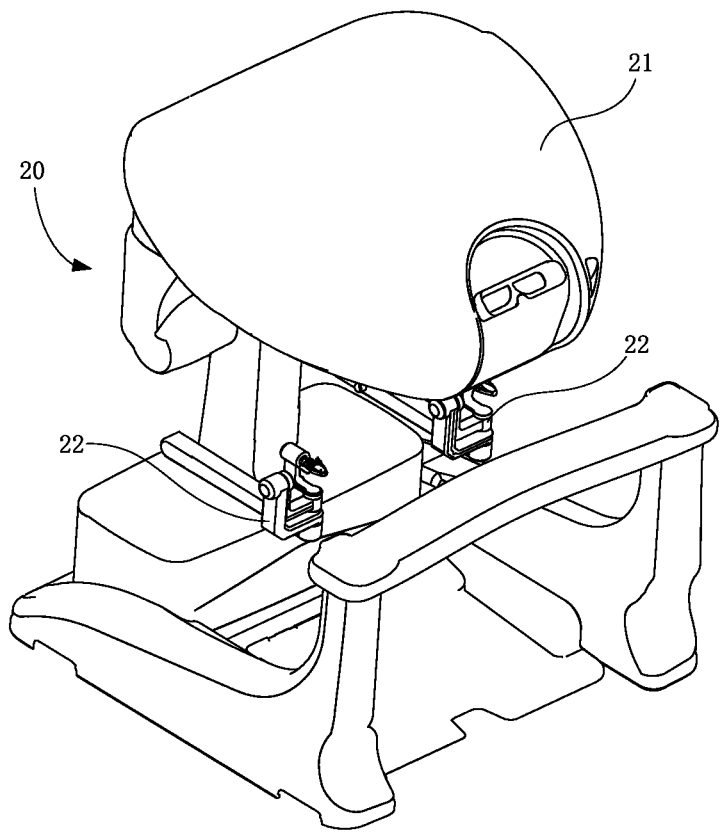
FIG. 2 is a schematic diagram of a main operating device of a surgical robot according to an embodiment of the present application.

An embodiment of the present application for a surgical robot is shown in FIGS. 1 and 2. The surgical robot includes a slave operating device 10 and a main operating device 20. The slave operating device 10 is located on the patient side for performing a surgical operation, wherein the slave operating device 10 includes a plurality of manipulator arms 11 and instruments 12 mounted on the manipulator arms 11, the instruments 12 may be electrocautery, forceps, clamps, staplers, cutters, etc., or it can also be cameras for acquiring images or other surgical instruments, a plurality of instruments 12 is inserted into the patient's body through different incisions. The manipulator arm is configured to be supported by the strut through a plurality of large arms, and in some other embodiments, the manipulator arm from the slave operating device can also be mounted on a wall or ceiling.

The manipulator arm 11 further includes a parallelogram linkage, the instrument 12 is removable mounted on the distal end of the parallelogram linkage, the parallelogram linkage can allow the movement of the instrument 12 with one or more mechanical DOF (e.g., all six Cartesian degrees of freedom, five or fewer Cartesian degrees of freedom, etc.). The parallelogram linkage is used to constrain and restrict the movement of the instrument 12 near a remote center of motion (RCM) on the surgical instrument that remains stationary relative to the patient, the remote center of motion (RCM) is usually located at the point where the instrument enters the patient's body. In some other embodiments, the structure of another large arm of the slave operating device is different, and a plurality of instruments of this type of slave operating device is detachable mounted on the power mechanism at the distal end of the large arm and enter the body through an incision, a plurality of the large arms controls and restrains the instruments to move near the remote motion center. For details, please refer to Chinese patent application No. 201810664598.2.

Surgical robots usually also include an imaging system (not shown) that enables an operator to view the surgical site from outside the patient's body. The imaging system of the present application differs from the usual and includes one or more video display devices having a video image acquisition function (e.g., an instrument 12 having an image capture function) and displaying the acquired image. Generally, the instrument 12 with image acquisition capability includes optical devices that comprises one or more imaging sensors (e.g., CCD or CMOS sensors) acquiring images inside the patient's body. The one or more imaging sensors can be placed at the distal end of the instrument 12 with image acquisition capabilities, and the signals generated by the one or more imaging sensors can be transmitted via cable or wirelessly for processing and display on the video display device.

The main operating device 20 is placed on the operator's side. The main operating device 20 is used to send control commands to the slave operating device 10 based on the operator's operation and to display the images obtained from the slave operating device 10. Through the main operating device 20, the operator can observe the three-dimensional imaging of the patient's body provided by the imaging system. By observing the three-dimensional images of the patient's body, the operator can control the slave operating device 10 to perform related operations (such as performing surgery or acquiring the patient's body image) with an immersive sensory. The main operating device 20 includes a master console 21 and an input device 22. The master console 21 includes a display device, an armrest, a processor, and an observation device, wherein the display device is used to display the images obtained by the above-mentioned imaging system. The armrest is used for placing the operator's arm and/or hand to allow the operator to operate the input device more comfortably, and the observation device is used to observe the image displayed by the display device. According to actual needs, the armrest can also be omitted; or the observation device can be omitted, then the display device can be directly observed. The operator controls the movement of the slave operating device 10 by operating the input device 22. The processor of the master console 21 processes the input signal of the input device 22 and issues a control command to the slave operating device. The slave operating device 10 is used to respond to the control command sent to the master console 21 and perform the corresponding operation.

Figure 3:
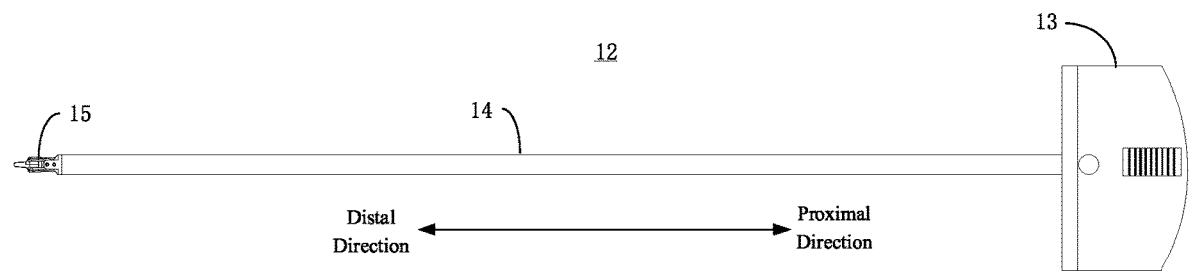
FIG. 3 is a schematic diagram of a surgical instrument according to an embodiment of the present application.

As shown in FIG. 3, the instrument 12 includes an end effector 15, an elongate shaft 14 and a drive device 13. The drive device 13 has a plurality of transmission units. The transmission units are coupled to the drive units in the manipulator arm 11 and can be driven by the drive units. The drive unit drives the movement of the end effector 15 through the transmission unit according to the control command from the master console 21. The transmission unit can be multiple flexible cables and winches, the proximal ends of the multiple cables are wound on the winches, the distal ends of the multiple cables are connected to the end effector, and the drive device 13 draws/pulls the flexible cables by driving the winches rotation to control the end effector. The end effector 15 has a joint assembly through which actions of multiple Cartesian degrees of freedom can be performed, such as pitch, yaw, etc. The end instrument 15 is used to perform a surgical operation. According to different requirements of the surgical operation, the end effector 15 can be an electric cauterizer, a clamp, a stapler, scissors, a camera, etc.

Figure 4:
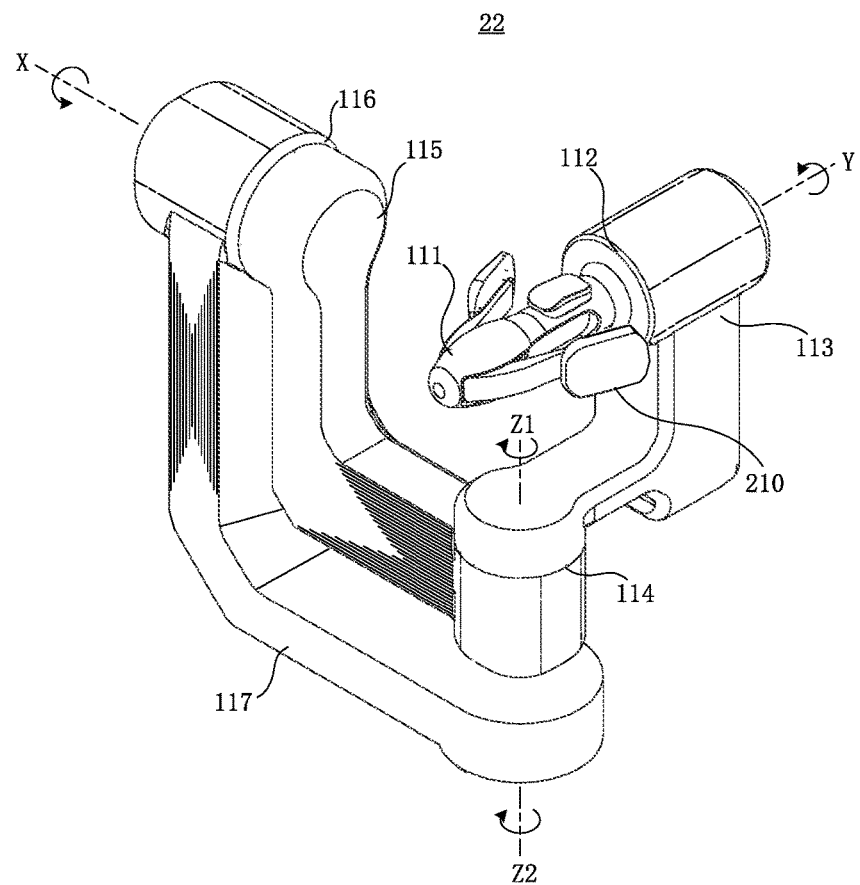
FIG. 4 is a schematic structural diagram of an input device according to an embodiment of the present application.

As shown in FIG. 4, the input device 22 includes a handle 111, a clamp 210, a plurality of L-shaped links 113, 115, 117, and a plurality of rotational joints 112, 114, 116, the clamp 210 is movably mounted on the handle 111, and the clamp 210 can move relative to the handle 111, and the handle 111 is rotationally connected to the first L-shaped link 113 through the first rotational joint 112, so that the handle 111 and the clamp 210 can rotate around the rotational axis Y of the rotational joint 112, and the first L-shaped link 113 is rotational connected to the second L-shaped link 115 through the second rotational joint 114, so that the first L-shaped link 113 can rotate around the rotational axis Z1 of the second rotating joint 114, and the second L-shaped link 115 is rotationally connected to the third L-shaped link 117 through the third rotational joint 116, so that the second L-shaped link 115 can rotate around the rotational axis X of the third rotational joint 116, and the third L-shaped link 117 is rotationally connected to the master console 21 through the fourth rotational joint (not shown in FIG. 4), so that the third L-shaped link 117 can rotate around the rotational axis of the fourth rotational joint.

Based on the handle 111, a plurality of L-shaped links 113, 115, 117, and a plurality of rotational joints 112, 114, 116, the clamp 210 can perform motions with multiple DOF. In other embodiments, the number of L-shaped links and rotational joints can be set according to the actual need for the freedom of motion of the clamp 210.

A pose mapping control is established between the input device 22 and the end effector 15 through the main operating device 20. Alternatively, the mapping can be a corresponding position relation, the corresponding position relation can be the distance proportional correspondence, the distance trend correspondence and other correspondence. Or, a corresponding motion relation, which can be the motion posture correspondence, the motion trend correspondence, and the like. The operator can control the instrument 12 to perform corresponding actions (such as pitch, yaw, roll, clamp, etc.) when operating the input device 22. The input device 22 can be provided on the master console 21. In other embodiments, the input device 22 can also be provided separately from the master console 21.

Wherein, after the opening and closing DOF motion of the clamp 210 relative to the handle 111 is mapped to the instrument 12, the opening and closing actions (such as clamping or shearing) of the end effector 15 can be controlled, and after the rotational DOF motion of the clamp 210 and/or the handle 111 around the first the rotational axis Y of the rotational joint 112 is mapped to the instrument 12, the roll motion of the end effector 15 can be controlled.

Figure 5:
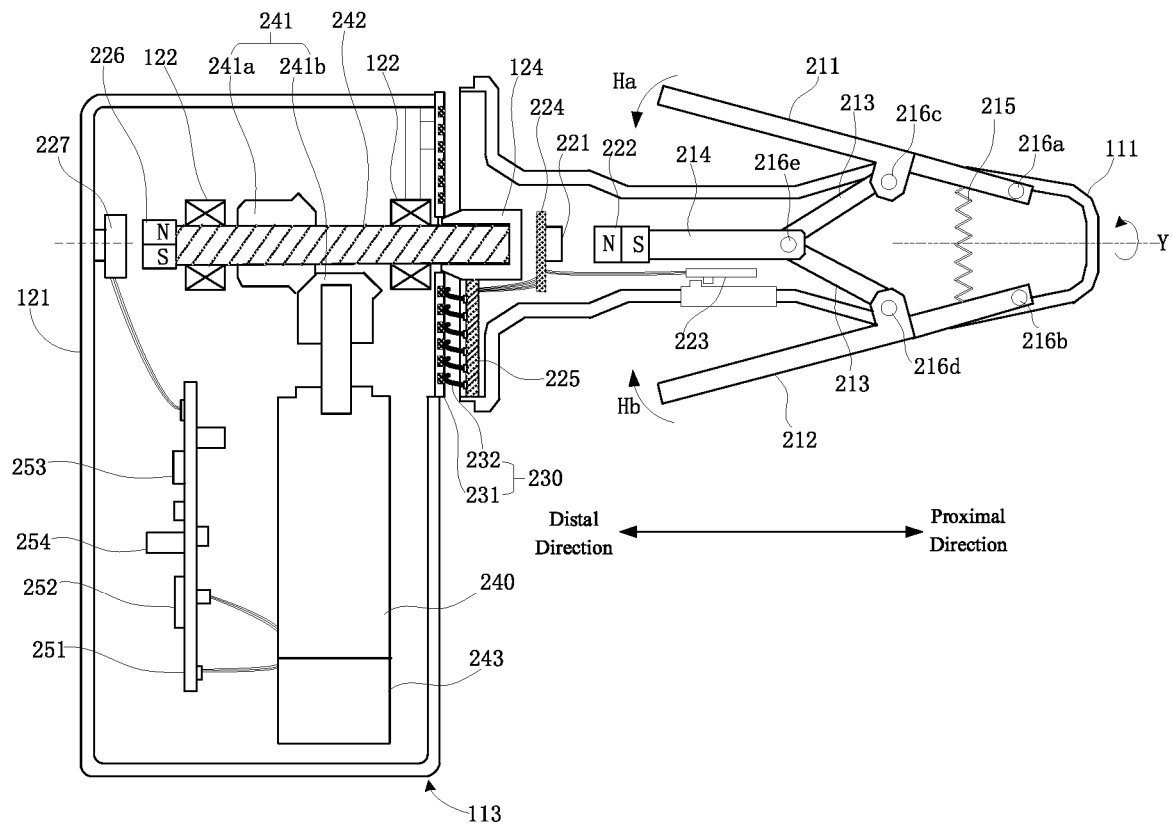
FIG. 5 is a cross-sectional view of the input device of FIG. 4 along a vertical direction of the rotational axis Y.

An embodiment of the present application is shown in FIG. 5, which is a schematic diagram of a cross-section taken along the rotational axis Y in FIG. 4. The first clamping arm 211 and the second clamping arm 212 of the clamp 210 are pivotally connected to the handle 111 respectively, the clamping arm 211 and the second clamping arm 212 can rotate around the pivots 216a, 216b along the directions Ha, Hb, respectively, that is, the opening and closing DOF motion of the clamp 210. An elastic member 215 is provided between the first clamping arm 211 and the second clamping arm 212, and the elastic member 215 is in a stretched state for maintaining the state of the clamp 210 and providing the operator with an operating feel.

The distal end of the handle 111 is fixedly connected to the rotating shaft 242 through the end cover 124, the end cover 124 is fixedly installed on the handle 111, and the rotating shaft 242 is rotationally connected to the support 121 of the first L-shaped link 113 through the bearing 122, so that the handle 111 is rotationally coupled to the support 121 by the rotating shaft 242 (the first rotating joint), so that the handle 210 and the clamp 210 can rotate along the rotational axis Y of the rotating shaft 242, this is the rotational DOF of the clamp 210 and/or the handle 111.

The input device 22 further includes a first sensor 221 and a second sensor 227. The first sensor 211 is mounted inside the handle 111 to detect the opening and closing DOF motion of the clamp 210. The second sensor 227 is mounted inside the support 121 to detect the rotational DOF motion of the clamp 210.

Further, a first magnet 222 is mounted inside the handle 111, and the first magnet 222 is indirectly connected to the clamp 210 through a linkage assembly. The linkage assembly includes a first link 213 and a second link 214, and the first link 213 are rotationally coupled to the first clamping arm 211 and the second clamping arm 212 through the pivots 216c, 216d, and the proximal end of the second link 214 is rotationally coupled to the first link 213 through the pivot 216e. The linkage assembly can make the first clamping arm 211 and the second clamping arm 212 move synchronously, and the synchronous movement indicates that when the operator only operates one of the first clamping arm 211 and the second clamping arm 212 to perform the opening and closing DOF motion, the other clamping arm is also driven by a synchronous motion mechanism (such as the linkage assembly) to perform an opening and closing DOF motion at the same angular velocity.

The first magnet 222 is fixedly installed at the distal end of the second link 214. When the first clamping arm 211 and the second clamping arm 212 move in the opening and closing DOF, the second link 214 will move in straight line along the rotational axis Y, thereby changing the relative distance between the first magnet 222 and the first sensor 221. The first sensor 221 detects the opening and closing DOF motion of the first clamping arm 211 and the second clamping arm 212 by detecting the change of the magnetic field strength of the first magnet 222 on it. For example, if the opening and closing angle changes, the master console 21 issues a command to control the opening and closing motion of the end effector 15 according to the result detected by the first sensor 221.

A second magnet 226 is disposed in the support 121, and the second magnet 226 is fixedly mounted on the rotating shaft 242. When the clamp 210 performs a rotational DOF motion, the second magnet 226 rotates relative to the second sensor 227 to cause the magnetic field strength of the second magnet 226 to change on the second sensor 227, the second sensor 227 detects the rotational DOF motion of the clamp 210 by detecting the change in the magnetic field strength of the second magnet 226 on it.

Since the first sensor 221 and the second sensor 227 are both magnetic sensors (for example, Hall sensors) in this embodiment, the first magnet 221 and the second magnet 226 are provided separately, that is, the first magnet 221 is mounted inside the handle 111, the second magnet 226 is disposed in the support 121, so that the magnetic fields of the first magnet 221 and the second magnet 226 can be prevented from interfering with each other, and the detection accuracy can be improved.

Further, the input device 22 further includes a motor 240, the motor 240 is located inside the first L-shaped link 113, the rotary shaft of the motor 240 is connected with the rotating shaft 242 through the gear set 241, and the first helical gear 241a of the gear set 240 is fixedly mounted on the rotating shaft 242, the second helical gear 241b is fixedly connected with the rotary shaft of the motor 240. The motor 240 applies torque to the rotating shaft 242 through the gear set 241, and then applies the torque to the handle 111, so that the motor 240 can apply force feedback to the clamp 210.

The motor 240 can also provide gravity compensation to the handle 111 and the clamp 210, which can prevent the handle 111 and the clamp 210 from rotating around the rotational axis Y due to gravity after the operator leaves the handle 111.

In one embodiment, the input device 22 further includes a controller 252 and a third sensor 243, the information of the rotational DOF motion of the handle 111 detected by the second sensor 227 is used to feed back to the controller 252, and the third sensor 243 detects the rotational motion information of the motor 240 and feeds the information to the controller 252. After comparing the rotational DOF motion information of the handle 111 with the rotational motion information of the motor 240 detected by the third sensor 243, the controller 252 controls the motor 240, so that the controller 252 forms a feedback closed-loop control for the motor 240 to avoid inaccurate control of the output of the motor 240 due to the gap of the gear set 241 or other transmissions, the controller 252 can control the output of the motor 240 more accurately. In some embodiments, the third sensor 243 is an encoder.

Since the first sensor 221 and the first magnet 222 are located inside the handle 111, the rotating shaft 242 has more space for installing the gear set 241, and also reduces the volume of the support 121.

Figure 6:
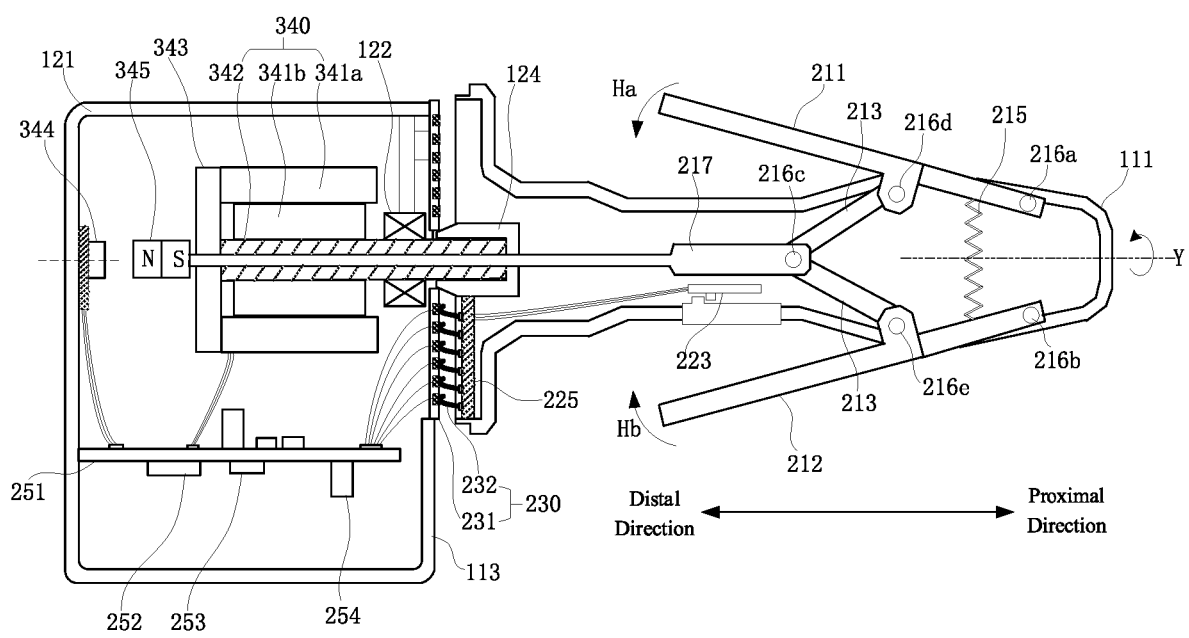
FIG. 6 is a cross-sectional view of an input device according to another embodiment of the present application.

The input device of an embodiment of the present application is shown in FIG. 6, the handle 111 is connected to the support 121 through a rotating shaft 342, and the rotating shaft 342 is also the rotary shaft of the motor 340. The motor 340 includes a stator 341*a* and a rotor 341*b*, and the rotating shaft 342 is fixedly connected with the rotor 341*b*.

Further, the rotating shaft 342 is hollow, the distal end of the first link 217 of the linkage assembly passes through the rotating shaft 342, the first magnet 345 is fixed on the distal end of the first link 217, and the first sensor 344 is installed on the support 121 in the position opposite to the first magnet 345, when the clamp 210 performs the opening and closing DOF motion, the first link 217 moves linearly along the rotational axis Y, and the first sensor 344 detects the opening and closing DOF motion of the clamp 210 by detecting the change of the magnetic field strength of the first magnet 345 on it.

The second sensor 343 is directly arranged on the motor 340, and the second sensor 343 is used to directly detect the rotational motion of the motor 340. Since the rotating shaft 342 is the rotary shaft of the motor 340, there is no intermediate transmission component such as a gear set, so there is no return clearance, so that the rotational motion of the motor 340 detected by the second sensor 343 is the output rotational motion of the motor 340, and also the rotational motion of the handle 111. Therefore, there is no need to set up a third sensor to detect the output of the motor 340, reducing the number of sensors and also simplifying the control of the motor 340. In one embodiment, the second sensor 343 is an encoder.

Figure 7A:
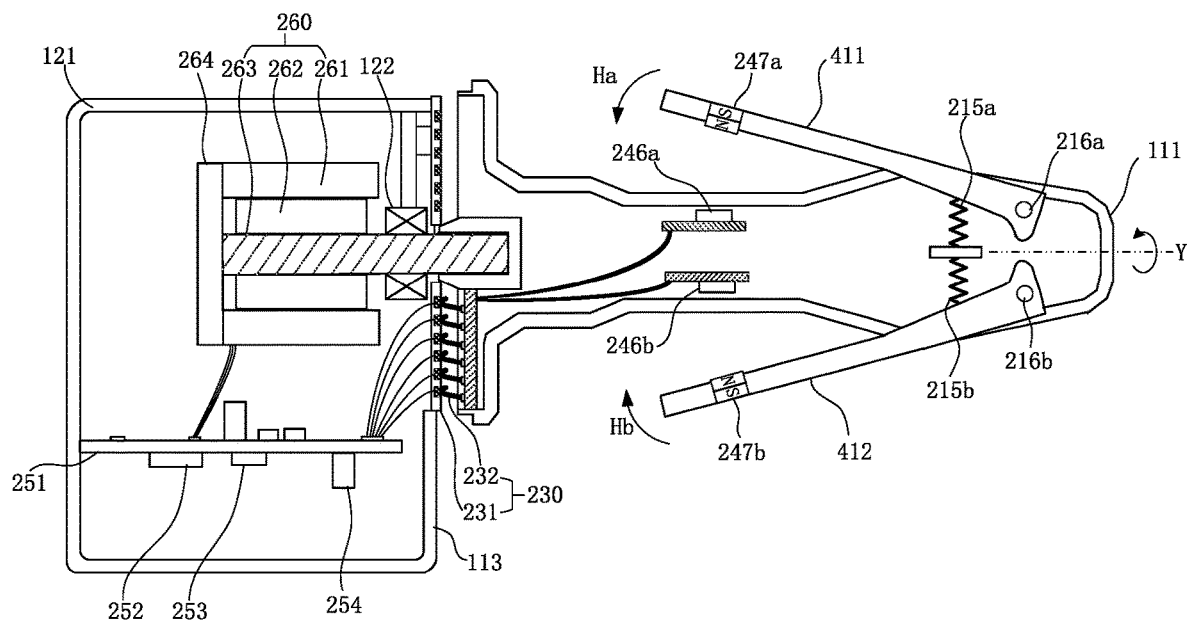
FIG. 7A is a cross-sectional view of an input device according to another embodiment of the present application.

The input device of an embodiment of the present application is shown in FIG. 7A. In this embodiment, the input device has no link assembly, and the first clamping arm 411 and the second clamping arm 412 separately connected to the handle 111 through the first elastic member 215*a* and the second elastic member 215*b*, respectively, and both the first clamping arm 411 and the second clamping arm 412 move independently of each other.

The first magnet 247*a* is mounted on the first clamping arm 411, the first magnet 247*b* is mounted on the second clamping arm 412, and the first sensors 246*a*, 246*b* are located between the first magnet 247*a* and the first magnet 247*b* inside the handle. When the first clamping arm 411 and the second clamping arm 412 perform the opening and closing DOF motion, the first magnets 247*a*, 247*b* will move closer to or away from the first sensor 246*a*, 246*b* with the movement of the first clamping arm 411 and the second clamping arm 412, the first sensor 246*a* detects the opening and closing motion of the first clamping arm 411 by detecting the magnetic field strength of the first magnet 247*a*, and the first sensor 246*b* detects the opening and closing motion of the second clamping arm 412 by detecting the magnetic field strength of the first magnet 247*b*.

Since the input device in this embodiment does not have a link assembly, the opening and closing DOF motion of the first clamping arm 411 and the second clamping arm 412 are independent of each other, and the movement of one of the first clamping arm 411 and the second clamping arm 412 does not affect the movement of the other. Therefore, it can be used in application scenarios where the operator needs to individually control each clamping part of the end effector 15 through the first clamping arm 411 and the second clamping arm 412 (for example, when the end effector is a retractor).

Figure 7B:
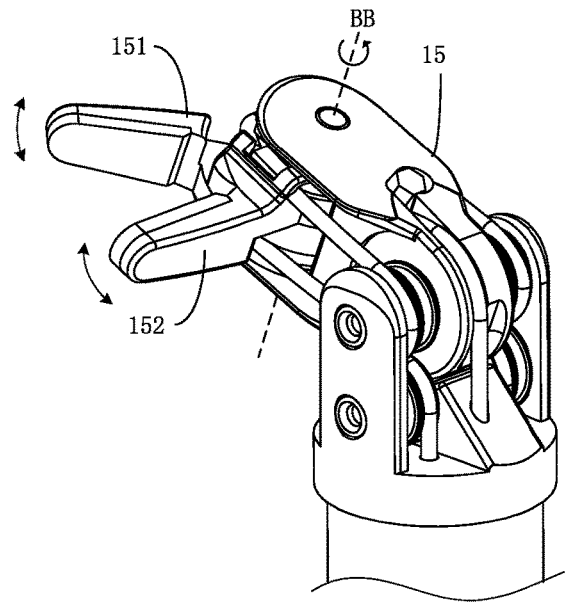
FIG. 7B is a schematic diagram of the action of an end effector according to an embodiment of the present application.

As shown in FIG. 7B, the first clamping arm 411 and the second clamping arm 412 establish a mapping with the end effector 15, and the first clamping component 151 and the second clamping component 152 of the end effector 15 can be individually controlled to rotate around the rotational axis BB', for example, the moving first clamping arm 411 can control the first clamping component 151 to move alone, while the stationary second clamping arm 412 controls the second clamping component 152 to maintain its original state.

Figure 8A:
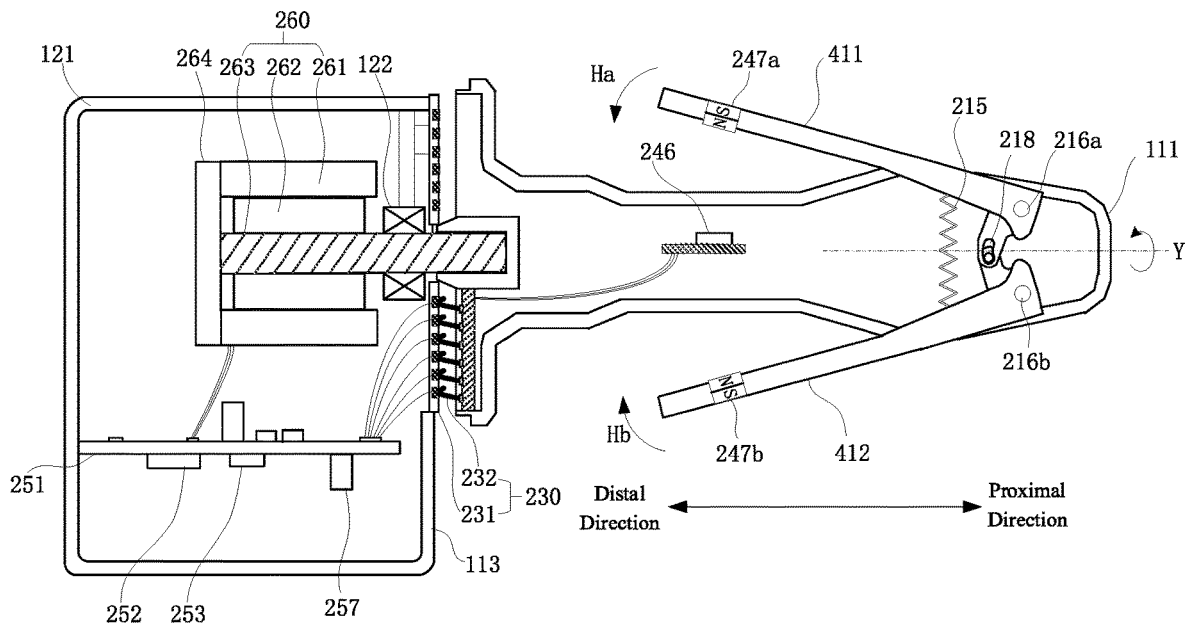
FIG. 8A is a cross-sectional view of an input device according to another embodiment of the present application.
Figure 8B:
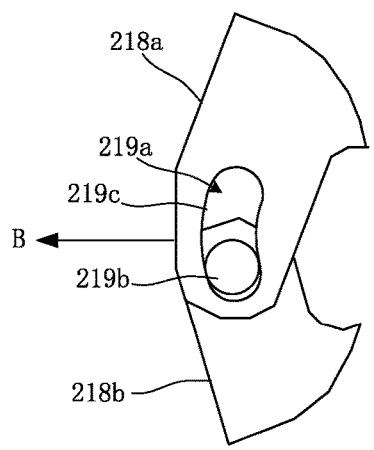
FIG. 8B is a schematic structural diagram of the synchronization mechanism in FIG. 8A.

As shown in FIG. 8A and FIG. 8B, the input device of an embodiment of the present application is provided with a synchronous motion mechanism 218 near the pivots 216*a* and 216*b* of the first clamping arm 411 and the second clamping arm 412. The synchronous motion mechanism 218 is used to make the first clamping arm 411 and the second clamping arm 412 move at the same angular velocity, ensuring that when the operator only operates one clamping arm of the first clamping arm 411 and the second clamping arm 412 to perform the opening and closing DOF motion, the synchronous motion mechanism 218 can enable the other clamping arm not operated by the operator to perform the opening and closing DOF motion at the same angular velocity, so that the end effector 15 can also perform clamping when only one clamping arm is operated.

Since the first clamping arm 411 and the second clamping arm 412 move synchronously, the movement of any one clamping arm will cause the other clamping arm to move at the same angular velocity, so the opening and closing DOF motion of the first clamping arm 411 and the second clamping arm 412 can be detected by a first sensor 246.

As shown in FIG. 8B, the synchronous motion mechanism 218 includes a first bracket 218*a* and a second bracket 218*b*, the first bracket 218*a* is fixedly connected to the first clamping arm 411, the second bracket 218*b* is fixedly connected to the second clamping arm 412. The free end of one bracket 218*a* is provided with an arc-shaped groove 219*a*, the free end of the second bracket 218*b* is provided with a convex column 219*b*, the convex column 219*b* is accommodated in the arc-shaped groove 219*a*, and the inner wall 219*c* of the arc-shaped groove 219*a* is pressed against the convex column 219*b*.

The arc-shaped groove 219*a* is roughly C-shaped, and the convex direction B of the arc-shaped groove 219*a* points to the distal end of the input device. The selection of the arc of the arc-shaped groove 219*a* is satisfied that when the motion of one of the first clamping arm 411 and the second clamping arm 412 causes the other clamping arm to move at the same angular velocity, so that when the first clamping arm 411 moves toward the handle 111, the arc-shaped groove 219*a* moves against the convex column 219*b* and drives the second clamping arm 412 to move toward the handle 111 at the same angular velocity.

Further, as shown in FIGS. 5 to 7A and FIGS. 8A, the input device 22 further includes a cordless electrical connector 230. The cordless electrical connector refers to an electrical connector that is not electrically connected directly through a cable, such as a conductive slip ring. The cordless electrical connector 230 electrically connects the first electronic device located inside the handle 111 to the second electronic device located inside the support 121, so that the first electronic device and the second electronic device communicate or transmit power through the cordless electrical connector. The first electronic device and the second electronic device can include one or more electronic components. In the embodiment shown in FIG. 5, the first electronic device includes the first sensor 221 and/or the switch assembly 223, and the second electronic device includes the signal processor 253, the controller 252 and the power source 254 located inside the support 121, and the signal processor 253, the controller 252 and the power source 254 are mounted on the second circuit board 251.

The opening and closing DOF motion information of the clamp 210 detected by the first sensor 221 is transmitted to the signal processor 253 through the cordless electrical connector 230, and the signal processor 253 processes the above information of the clamp 210 and transmits it to the processor of the master console 21, for example, the signal processor 253 converts the analog signal input from the first sensor 221 into a digital signal and transmits it to the processor of the master console 21.

The power supply 254 is used to provide power to the first electronic device through the cordless electrical connector 230. Since the power supply 254 directly supplies power to the electronic device on the side of the handle 111 through the cordless electrical connector 230, there is no conversion of electrical power in the middle, which reduces the power conversion element, so that the volume of the entire input device is more compact and the power utilization rate is higher. In the embodiment shown in FIG. 6, the first electronic device includes a switch assembly 223, and the second electronic device includes a switch signal processor (not shown in the figure), and the switch signal processor is used for receiving the control signal sent by the switch assembly 223.

Further, the cordless electrical connector 230 includes a first connection portion 231 and a second connection portion 232. The first connection portion 231 is fixedly mounted on the support 121, and the second connection portion 232 is fixedly mounted on the handle 111. The surface of the conductive part of the first connection portion 231 abuts against the surface of the conductive part of the second connection portion 232, so that the first connection portion 231 is electrically coupled with the second connection portion 232, so that no matter how the handle 111 is rotated, the first connection portion 231 and the second connection portion 231 can always maintain the electrical connection, thereby allowing the handle 111 to rotate infinitely in the rotational DOF. It is very necessary that the handle 111 can rotate infinitely, for example, during the operation, the infinite rotation of the handle 111 can make the operator control the rolling motion of the instrument 12 more conveniently.

The second connection portion 232 is electrically connected to the first electronic device through the first circuit board 225, and the first connection portion 231 is electrically connected to the second electronic device through the second circuit board 251. Since the electrical signal of the first electronic device in the handle 111 communicates with the second electronic device in the support through the cordless electrical connector 230, so no matter how the handle 111 is rotated, it will not affect the electrical signal transmission in the handle 111, and in the process of transmitting the electrical signal of the first electronic device to the second electronic device through the cordless electrical connector 230, the electrical signal does not need to undergo any conversion, which avoids the signal loss in the transmission process through the transmission mode of the converted signal.

Figure 9A:
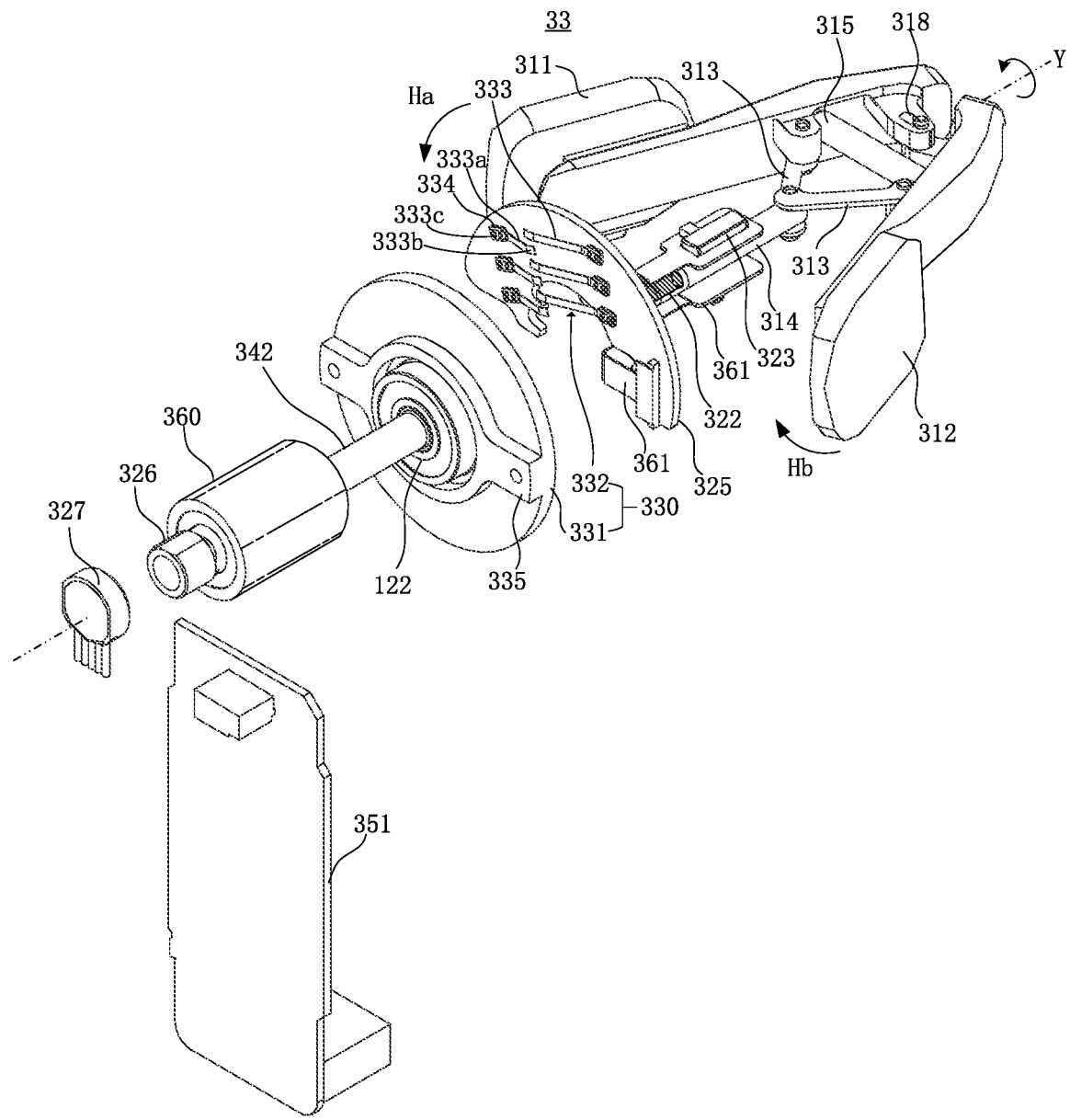
FIGS. 9A-9B are exploded views of an input device according to an embodiment of the present application.

The input device 33 according to an embodiment of the present application is shown in FIGS. 9A-12, which is to show the internal structure of the input device 33, the handle and the casing of the first L-shaped link are not shown in FIG. 9A. The first sensor 321 and the first magnet 322 of the input device 33 are located inside the handle, the first magnet 322 is located at the distal end of the second link 314, the second link 314 is pivotally connected to the first link 313, and the first link 313 is pivotally connected to the first clamping arm 311 and the second clamping arm 312, the first sensor 321 detects the opening and closing DOF motion of the clamp 210 by detecting the change of the magnetic field strength of the first magnet 322 on it.

In this embodiment, the first clamping arm 311 is connected to and the second clamping arm 312 through the synchronous motion mechanism 318 and the linkage assembly at the same time, and the elastic member 315 is located between the link assembly and the synchronous motion mechanism 318 to ensure that the first clamping arm 311 and the second clamping arm 312 move at the same angular velocity. The handle 111 is also provided with a dial button 323*a*, the dial button 323*a* is coupled with the switch assembly 323, and the operator can make the switch assembly 323 send a control signal by operating the dial button 323*a*.

The first sensor 321 and/or the switch assembly 323 are connected to the first circuit board 325 through the flexible circuit board 361, the first circuit board 325 is electrically connected with the cordless electrical connector 330, and the electrical signals of the first sensor 321 and/or the switch assembly 323 are transmitted to the support through the cordless electrical connector 330, and the flexible circuit board 361 enables the first sensor 321 and the switch assembly 323 to be more conveniently connected to the first circuit board 325.

In this embodiment, the first connection portion 331 of the cordless electrical connector 330 is disc-shaped, and includes a plurality of conductive rings 331*a* and a base 335, the plurality of conductive rings 331*a* is fixedly installed on the base 335, and the second connection portion 332 includes a plurality of conductive terminals 333, each conductive terminal 333 includes a conductive elastic connecting plate 333*a* and a connecting base 334, and the surfaces of the free ends 333*b* of the plurality of connecting plates 333*a* abut against the first surfaces of the distal ends of the plurality of conductive rings 331*a*, so as to realize the electrical connection between the second connection portion 332 and the first connection portion 331.

The plurality of conductive rings 331*a* is concentrically arranged along the rotational axis Y, and the conductive rings 331*a* are insulated from each other and located on the same first plane. Similarly, the plurality of conductive terminals 333 is also distributed on a plurality of concentric circles centered on the rotational axis Y, when the first clamping arm 311 and the second clamping arm 312 perform a rotational DOF motion, the free ends 333b of the plurality of conductive terminals 333 slide on the first surfaces of the plurality of conductive rings 331a respectively, during sliding, the conductive terminal 333 always abuts against the conductive ring 331a to maintain the electrical connection between the two, thereby allowing the handle 111 and the clamp 210 to rotate infinitely electrically.

The other end 333c of the connecting plate 333a is fixedly connected to the first circuit board 325 through the connecting base 334, and the plurality of conductive terminals 333 is electrically connected to the flexible circuit board 361 through the first circuit board 325. In one embodiment, the plurality of conductive terminals 333 is interleaved in the first circuit board 325 with a roughly C-shaped structure, and the free ends 333a of the plurality of conductive terminals 333 are substantially distributed on a first straight line perpendicular to the rotational axis Y, which allows the plurality of conductive terminals 333 to occupy less space, thus making the first circuit board 325 more compact.

Figure 9B:
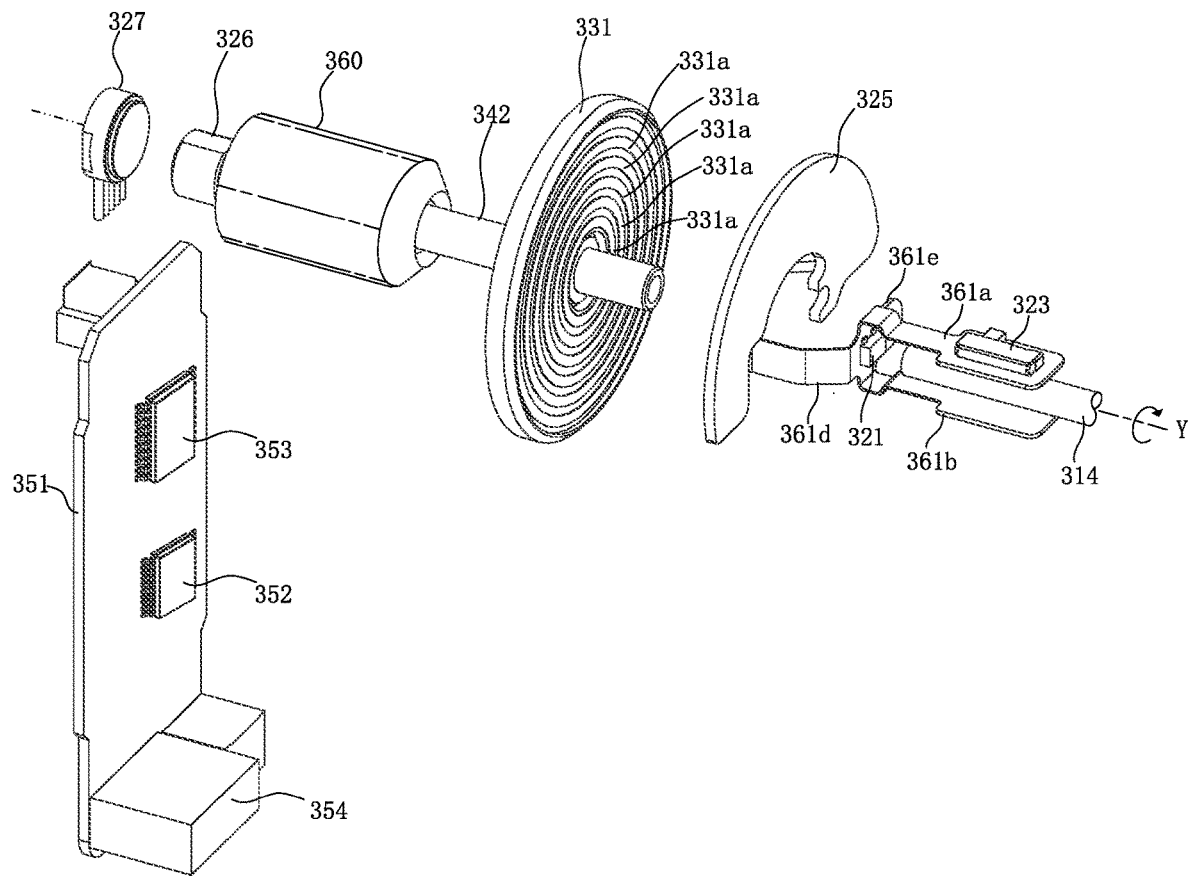

Further, as shown in FIG. 9B, the flexible circuit board 361 is the Y-shaped, and the flexible circuit board 361 includes a first flexible circuit board body 361a, a second flexible circuit board body 361b and a third flexible circuit board body 361c arranged in one piece. The three flexible circuit board body forms a Y-shaped, that is, the free ends of the first flexible circuit board body 361a and the second flexible circuit board body 361b extend toward the proximal end of the handle 111, and the third flexible circuit board body 361c extends along the distal end of the handle 111 to the first circuit board 325, the first flexible circuit board body 361a, the second flexible circuit board body 361b and the third flexible circuit board body 361c are jointly connected to the fourth flexible circuit board body 361d in the middle area of the flexible circuit board 361, the first sensor 321 is arranged on the fourth flexible circuit board body 361d. The first flexible circuit board body 361a and the second flexible circuit board body 361b are disposed opposite to each other, and a space between them is formed to accommodate the distal end of the second link 314, during the opening and closing DOF motion of the clamp 210, the distal end of the second link 314 moves linearly within this space.

The two switch assemblies 323 are respectively disposed on the opposite side of the first flexible circuit board body 361a and the second flexible circuit board body 361b, and the signals of the switch assembly 323 and the first sensor 321 are transmitted to the second connection portion 332 of the cordless electrical connector 330 through the third flexible circuit board body 361c, and then transmitted to the signal processor 353 on the second circuit board 351 through the first connection portion 331, and the controller 352 of the motor 360 and the power supply 354 are also installed on the second circuit board 351. When the first flexible electric board 361 electrically connects the first sensor 321 and the switch assembly 323 to the first circuit board 325, it also acts as a fixed support for the first sensor 321 and the switch assembly 323.

Further, the rotating shaft 342 of the motor 360 is fixedly connected to the handle 111 through the first connection portion 331, and the proximal end of the rotating shaft 342 is fixedly connected to the handle 111 through the end cover 324, and the end cover 324 is fixed inside the handle 111. The rotating shaft 342 is rotationally connected to the support through the bearing 122, and the motor 360 exerts torque directly on the handle through the rotating shaft 342. The second magnet 326 is provided on the distal end of the rotating shaft 342, and the second sensor 327 detects the rotation of the rotating shaft 342 by detecting the change in the magnetic field strength of the second magnet 326 on it, thus detecting the rotational DOF motion of the clamp 210.

Figure 10:
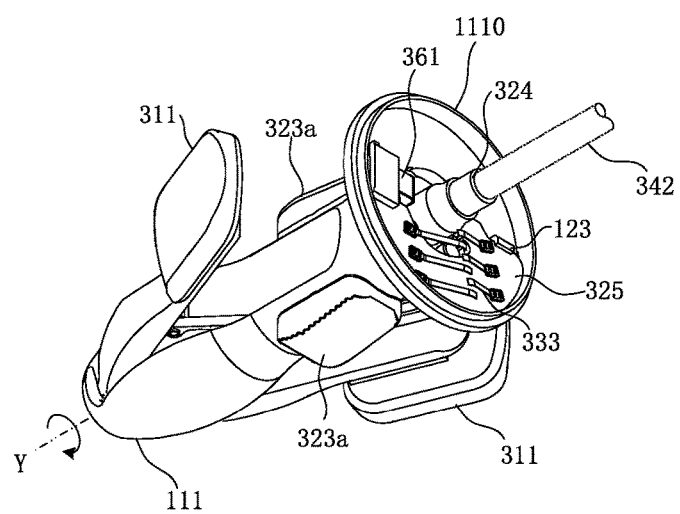
FIG. 10 is a schematic structural diagram of one side of the handle of the input device in the embodiment shown in FIG. 9A.
Figure 11:
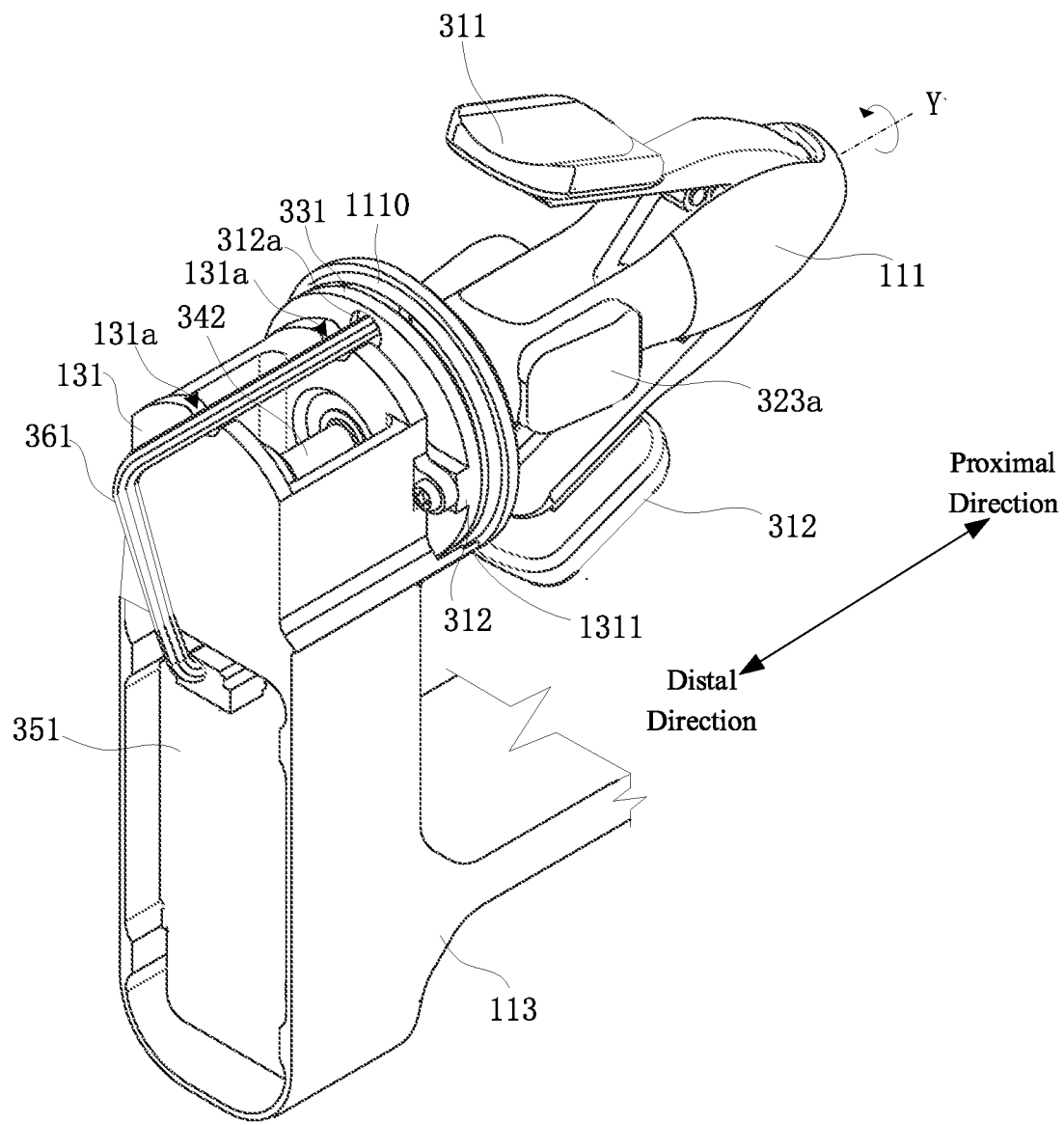
FIG. 11 is a perspective view of the input device in the embodiment shown in FIG. 9A.
Figure 12:
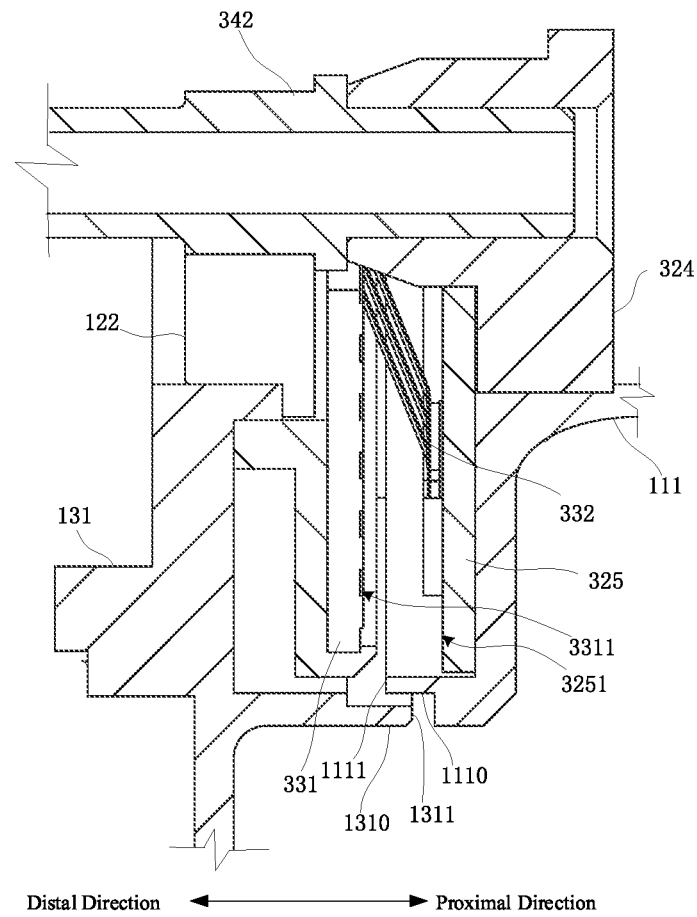
FIG. 12 is a partial cross-sectional view of the input device in FIG. 11 along the vertical direction of the rotational axis Y.

As shown in FIGS. 10-12, the first circuit board 325 is fixed on the inner side of the distal end of the handle 111 through the fixing portion 123, the fixing portion 123 may be a clasp and/or bolt construction, and the distal end of the handle 111 extends beyond the first edge 1110, the distal surface 1111 of the first edge 1110 is located between the distal surface 3251 of the first circuit board 325 and the first connection portion 331.

Further, as shown in FIG. 11, the first connection portion 331 of the cordless electrical connector 330 is fixedly mounted on the support 131 through the base 312, the first connection portion 331 is electrically coupled to the second circuit board 351 through the cable 371, and the top of the support 131 has a notch 131a for accommodating the cable 371, and the base 312 has a through-hole 312a. One end of the cable 371 is electrically connected to the second surface of the first connection portion 331 away from the second connection portion 332, and the other end passes through the through-hole 312a and through the support 131 along the notch 131a, extends along the distal end of the input device 33 and is connected to the second circuit board 351, so that the electrical signal from the handle 111 is transmitted first through the cordless electrical connector 330 and then through the cable 371 to the electronic device in the support 131. There is no direct cable connection between the electronic device in the handle 111 and the electronic device in the support 131.

Further, as shown in FIG. 12, the proximal end of the support 131 extends out of the second edge 1310, and the proximal surface 1311 of the second edge 1310 is located between the distal surface 1111 of the first edge 1110 and the first circuit board 325. After the handle 111 is connected to the support 131, the distal surface 1111 of the first edge 1110 of the handle 111 is closer to the first connection portion 331 than the proximal surface 1311 of the second edge 1310, so that the first edge 1110 and the second edge 1310 are partially overlapped, thereby preventing foreign bodies from entering the input device 33 from the gap between the first connection portion 331 and the second connection portion 332.

Figure 13:
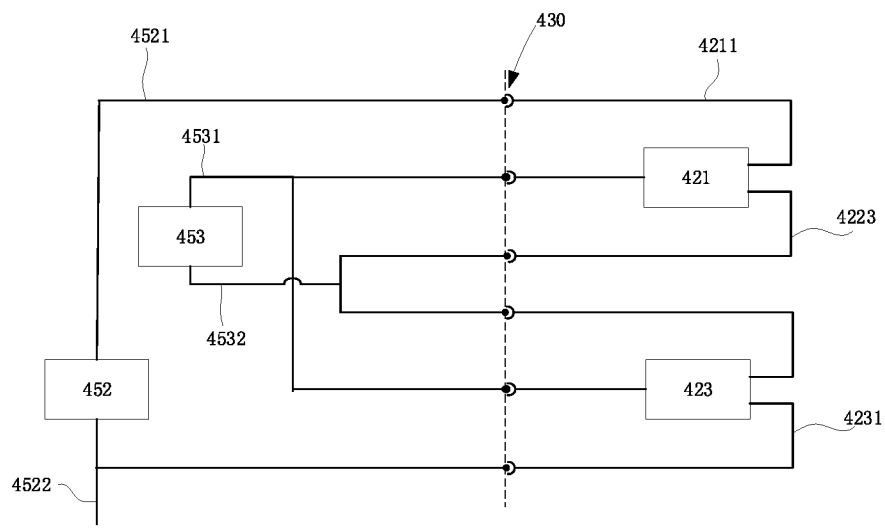
FIG. 13 is a block diagram of signal transmission of an input device according to an embodiment of the present application.

FIG. 13 is a schematic diagram of the internal electrical signal transmission of the input device, the signal processor 452 and the power supply 453 are located inside the support, the first sensor 421 and the switch assembly 423 are located inside the handle, and the power supply 4531 establishes an electrical connection with the first sensor 421 and the switch assembly 423 through the power cords 4531, 4532 and the cordless electrical connectors 430, so as to provide power to the first sensor 421 and the switch assembly 423 through the cordless electrical connector 430.

The signal emitted by the first sensor 421 is transmitted to the first input signal line 4521 through the first signal output line 4211 and the cordless electrical connector 430, and is input to the signal processor 452, after processing the information sent by the first sensor 421, the signal processor 452 outputs to the processor in the master console 21 through the second signal output line 4522.

The control signal emitted by the switch assembly 423 is transmitted to the processor inside the master console 21 through the third signal output line 4231, the cordless electrical connector 430 and the second signal output line 4522, and the switch assembly 432 emits the control signal to control the master-slave mapping between the main operating device 20 and the slave operating device 10, thereby cutting off the control of the main operating device 20 to the slave operating device 10. And/or the control signal sent by the switch assembly 432 is used to control the on-off of the power supply 453, so as to cut off the power supply of the power supply 453 to the electronic device in the support and/or the handle, so that the electronic device stops working.

For example, the switch assembly 432 sends out a signal for cutting off the power supply of the power supply 453 to the first sensor 421, so that the first sensor 432 suspends work due to the loss of power, and the opening and closing free motion of the clamp cannot be detected and thus cannot be mapped to the slave operating device.

It can be understood that, in some other embodiments, it may be that the first connection portion of the cordless electrical connector is a plurality of conductive terminals, and the second connection portion includes a plurality of conductive rings, or that both the first connection portion and the second connection portion are a plurality of conductive rings.

The technical features of the above-described embodiments can be combined in any way. For brevity of the description, all possible combinations of the technical features in the above-described embodiments are not described. However, as long as there is no contradiction between the combinations of these technical features, they should be considered as the scope of this specification.

The above-described embodiments have only expressed several embodiments of the present disclosure, which are described in more specific and detailed, but are not therefore to be construed as limiting the scope of the present disclosure. It should be noted that variations and modifications may be made to those of skill in the art without departing from the spirit of the present disclosure, all of which fall within the scope of the present disclosure. Therefore, the scope of protection of the patent of the present application shall be subject to the appended claims.

What is claimed is:

1. An input device, comprising:
a support;
a handle, wherein the handle is configured to be rotationally connected to the support;
a clamp, wherein the clamp is mounted on the handle, the clamp is configured to perform an opening and closing degrees of freedom (DOF) motion relative to the handle, and the clamp is further configured to perform a rotational DOF motion;
a cordless electrical connector, wherein the cordless electrical connector comprises a first connection portion and a second connection portion, the first connection portion is mounted on the support, the second connection portion is mounted on the handle, and a surface of the first connection portion abuts against a surface of the second connection portion, so that the first connection portion is electrically coupled to the second connection portion;
a first sensor, wherein the first sensor is mounted inside the handle, the first sensor is electrically connected to the second connection portion, and the first sensor is configured to detect the opening and closing DOF motion of the clamp; and
a second sensor, wherein the second sensor is mounted inside the support, and the second sensor is configured to detect the rotational DOF motion of the clamp.

2. The input device of claim 1, wherein the first connection portion comprises one of a first conductive ring and a conductive terminal, the second connection portion comprises another one of the conductive ring and the conductive terminal, and a surface of the first conductive ring abuts against a surface of the conductive terminal.

3. The input device of claim 2, wherein there are a plurality of first conductive rings, including the first conductive ring, and the plurality of first conductive rings is arranged concentrically, the plurality of first conductive rings is located on a first plane, and the first plane is perpendicular to a rotational axis of the handle.

4. The input device of claim 3, wherein the input device further comprises a first circuit board and a second circuit board, the first circuit board is mounted on the handle, a plurality of conductive terminals, including the conductive terminal, is staggered mounted on the first circuit board and electrically coupled to the first circuit board, the second circuit board is mounted inside the support, and the plurality of first conductive rings is electrically connected to the second circuit board.

5. The input device of claim 1, wherein the input device further comprises a first magnet, the first magnet is connected with the clamp, and the opening and closing DOF motion of the clamp relative to the handle makes the first magnet move relative to the first sensor, so that the first sensor detects changes in magnetic field strength to detect the opening and closing DOF motion of the clamp.

6. The input device of claim 5, wherein the first magnet is connected to the clamp through a linkage assembly, the linkage assembly comprises a first link and a second link, one end of the first link is pivotally connected to the clamp, and another end is pivotally connected to a proximal end of the second link, the second link is located between the first link and the support, and the first magnet is fixed at a distal end of the second link.

7. The input device of claim 5, wherein the input device further comprises a rotating shaft which is rotationally connected with the support, a second magnet is disposed on the rotating shaft, and a rotation of the rotating shaft relative to the support rotates the second magnet relative to the second sensor, so that the second sensor detects changes in magnetic field strength to detect the rotational DOF motion of the clamp.

8. The input device of claim 7, wherein the input device further comprises a motor located inside the support, a rotary shaft of the motor is connected with the rotating shaft through a gear, or the rotating shaft is fixedly with a rotor of the motor.

9. The input device of claim 8, wherein the input device further comprises a third sensor and a controller, the third sensor is configured to detect a rotational motion of the motor, and the controller is configured to control the motor according to information detected by the second sensor and the third sensor.

10. A surgical robot, comprising:
a main operating device and a slave operating device, wherein the main operating device is configured to control the slave operating device through master-slave mapping; the main operating device comprises an input device and a processor, wherein the input device comprises:
a support;
a handle, the handle is configured to be rotationally connected to the support;
a cordless electrical connector, wherein the cordless electrical connector comprises a first connection portion and a second connection portion, the first connection portion is mounted on the support, the second connection portion is mounted on the handle, and a surface of the first connection portion abuts against a surface of the second connection portion, so that the first connection portion is electrically coupled to the second connection portion; and a switch assembly, wherein the switch assembly is electrically connected to the second connection portion, the switch assembly is used to send out a control signal; and the processor is configured to control an on-off of the master-slave mapping between the main operating device and the slave operating device according to the control signal.

11. The surgical robot of claim 10, wherein the input device further comprises a flexible circuit board, and the switch assembly is electrically connected to the cordless electrical connector through the flexible circuit board, the flexible circuit board comprises a first flexible circuit board body, a second flexible circuit board body, and a third flexible circuit board body, free ends of the first flexible circuit board body and the second flexible circuit board body extend toward a proximal end of the handle, and the third flexible circuit board body extends along a distal end of the handle to be electrically connected to the cordless electrical connector.

12. The surgical robot of claim 11, wherein the input device further comprises a first sensor mounted inside the handle, the first sensor is used to detect opening and closing DOF motion of a clamp mounted on the handle, the first sensor is mounted on a middle area of the flexible circuit board, and the two switch assemblies, including the switching assembly, are respectively provided on the first flexible circuit board body and the second flexible circuit board body.

13. An input device, comprising:
a support;
a handle, wherein the handle is configured to be rotationally connected to the support;
a clamp, wherein the clamp is mounted on the handle, the clamp is configured to perform opening and closing degrees of freedom (DOF) motion relative to the handle, and the clamp is further configured to perform a rotational DOF motion;
a rotating shaft, wherein the rotating shaft is fixedly connected to the handle and rotationally connected with the support;
a first sensor, wherein the first sensor is mounted inside the handle, and the first sensor is configured to detect the opening and closing DOF motion of the clamp;
a second sensor, wherein the second sensor is mounted inside the support, and the second sensor is configured to detect the rotational DOF motion of the clamp; and
a first magnet, wherein the first magnet is fixed at a distal end of the rotating shaft located inside the support, and the second sensor detects the rotational DOF motion of the clamp by detecting changes in magnetic field strength of the first magnet on it.

14. The input device of claim 13, wherein the input device further comprises at least one second magnet located inside the handle, and the first sensor detects the opening and closing DOF motion of the clamp by detecting changes in magnetic field strength of the second magnet on it.

15. The input device of claim 13, wherein the input device further comprises a cordless electrical connector, wherein the cordless electrical connector comprises a first connection portion and a second connection portion, the first connection portion is mounted on the support, the second connection portion is mounted on the handle, and a surface of the first connection portion abuts against a surface of the second connection portion, so that the first connection portion is electrically coupled to the second connection portion; and the first sensor is electrically connected to the second connection portion.

16. The input device of claim 15, wherein the first connection portion comprises one of a first conductive ring and a conductive terminal, the second connection portion comprises another one of the conductive ring and the conductive terminal, and a surface of the first conductive ring abuts against a surface of the conductive terminal.

17. The input device of claim 16, wherein there are a plurality of first conductive rings, including the first conductive ring, and the plurality of first conductive rings is arranged concentrically, the plurality of first conductive rings is located on a first plane, and the first plane is perpendicular to a rotational axis of the handle.

18. The input device of claim 14, wherein the second magnet is connected to the clamp through a linkage assembly, the linkage assembly comprises a first link and a second link, one end of the first link is pivotally connected to the clamp, and another end is pivotally connected to a proximal end of the second link, the second link is located between the first link and the support, and the second magnet is fixed at a distal end of the second link.

* * * * *